(12) United States Patent
Akaba

(10) Patent No.: US 8,371,632 B2
(45) Date of Patent: Feb. 12, 2013

(54) MOUNTING STRUCTURE FOR A PILLAR GARNISH

(75) Inventor: Shogo Akaba, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 62 days.

(21) Appl. No.: 13/122,008

(22) PCT Filed: Oct. 16, 2009

(86) PCT No.: PCT/JP2009/005424
§ 371 (c)(1),
(2), (4) Date: Mar. 31, 2011

(87) PCT Pub. No.: WO2010/052834
PCT Pub. Date: May 14, 2010

(65) Prior Publication Data
US 2011/0175386 A1    Jul. 21, 2011

(30) Foreign Application Priority Data

Nov. 5, 2008    (JP) ................................ 2008-284771

(51) Int. Cl.
*B60N 3/02* (2006.01)
(52) U.S. Cl. .................. 296/1.02; 296/1.08; 16/DIG. 12
(58) Field of Classification Search ................. 296/1.02, 296/1.08, 71, 193.06; 16/DIG. 12
See application file for complete search history.

(56) References Cited

U.S. PATENT DOCUMENTS 6,037,038 A * 3/2000 Kuhr .............................. 428/188

FOREIGN PATENT DOCUMENTS

| JP | S57-032529 U | 2/1982 |
| JP | S63-048642 U | 4/1988 |
| JP | 3980315 B2 | 9/2007 |
| JP | 2008-155710 A | 7/2008 |

* cited by examiner

*Primary Examiner* — Glenn Dayoan
*Assistant Examiner* — Jason S Daniels
(74) *Attorney, Agent, or Firm* — Carrier Blackman & Associates, P.C.; Joseph P. Carrier; William D. Blackman

(57) ABSTRACT

A garnish including an integrally molded grip is attached to a center pillar of a vehicle body with a bracket. The bracket attaches to a part of the pillar adjacent to the grip using a threaded bolt provided on an outboard side of the garnish. An opening is formed in the garnish for attaching the garnish to the pillar. A lid closes the opening. Integrally forming the grip with the garnish eliminates the need for positioning the two parts relative to each other and reduces the number of component parts. Providing the bracket for attachment adjacent to the base end of the grip improves the mounting strength of the grip. As the lid closing the opening is concealed by the grip when viewed inside the passenger compartment, the opening can be made so large as to improve the efficiency of the assembly work.

3 Claims, 3 Drawing Sheets

MOUNTING STRUCTURE FOR A PILLAR GARNISH

TECHNICAL FIELD

The present invention relates to a mounting structure for a pillar garnish that covers the inboard side of the pillar of a vehicle body.

BACKGROUND OF THE INVENTION

Conventionally known is to provide a grip to a pillar of a vehicle body in such a manner as to have the grip graspable to a vehicle occupant during boarding or unboarding; for example, the grip is provided on a center pillar for assisting the vehicle occupant boarding or unboarding the back seat of the vehicle (Refer to patent document 1).

PRIOR ART DOCUMENT

Patent Document

[Patent document 1]: Japanese patent No. 3980315

BRIEF SUMMARY OF THE INVENTION

Task to be Accomplished by the Invention

In the invention disclosed in the above-mentioned patent document 1, the legs of a C-shaped grip (both ends of the C-shaped grip) are attached to an inner panel of a center pillar by using a plurality of bolts before mounting a garnish on the inboard side of the center pillar thereof. However, because the grip and the garnish are individually mounted on the vehicle body (center pillar), there may be some difficulty in precisely positioning the grip and the garnish to each other.

In particular, a gap which is created between the garnish and the grip, and the gap which is created between the garnish and the pillar may be affected by the positioning of the parts so that the gap may become broader and be noticeable if the positioning is not adequately precise, thereby impairing the attractiveness of the assembled parts. To remedy such a problem, a separate cover is needed, thereby increasing the number of component parts.

Means to Accomplish the Task

To provide a solution to the problems such as the difficulty in positioning the garnish and the grip, and the increase in the number of component parts, the present invention provides a mounting structure for a pillar garnish, comprises: a garnish (3) covering an inboard side of a pillar (2, 5a) of a vehicle body (1); and a grip (4) provided on an inboard side of the pillar (2, 5a) so as to be graspable for a vehicle occupant boarding or unboarding the vehicle, the grip (4) being integrally molded with the garnish (3); wherein the garnish (3) comprises a mounting bracket (3a) integrally formed in an outboard part of the garnish (3) adjacent to a base end of the grip (4), and an opening (3b) affording an access to the mounting bracket (3a), the garnish (3) further comprising a lid (10) closing the opening.

More specifically, the grip (4) may be given with an arch-shape extending in a fore and aft direction, and the grip (4) does not overlap with an edge (11) of the opening (3b) adjacent to the grip (4). Also, an outboard edge of the lid (10) may be positioned so as to be covered by a trim member (12) attached to the pillar (2, 5a).

Effect of the Invention

Thus, according to the present invention, by integrally molding the grip with the garnish which is attached to the pillar, the need for positional adjustment of the garnish and the pillar is eliminated, and by providing the bracket to a part of the garnish adjacent to the base end of the grip, the garnish can be attached to the pillar providing the grip with an adequate mechanical strength. As the grip is integrally formed with the garnish, the difficulty associated with the positional adjustment of the garnish and the grip is eliminated, and number of component parts is reduced. As the mounting bracket is provided adjacent to the outboard side of the grip, the opening provided for the assembly work and hence the lid are concealed by the grip when viewed from the inboard side, allowing the opening to be made so large as to improve the work efficiency.

In particular, if the grip is formed with the garnish in an arch-shape extending in one of the fore and aft directions, and the edge of the opening adjacent to the grip does not overlap with the grip when viewed in the fore and aft direction, the release directions of the mold parts for molding the grip and the mounting bracket can be made coincide with each other, thereby simplifying the process of producing the integral assembly of the grip and the garnish. Also, if an outboard edge of the lid is in a position that can be concealed by the trim attached to the pillar, the gap between the lid and the pillar is concealed by the trim, thereby making the edge of the lid less noticeable, and enhancing the external appearance of the structure.

DETAILED DESCRIPTION OF THE PREFERRED EMBODIMENT (S)

Figure 1:
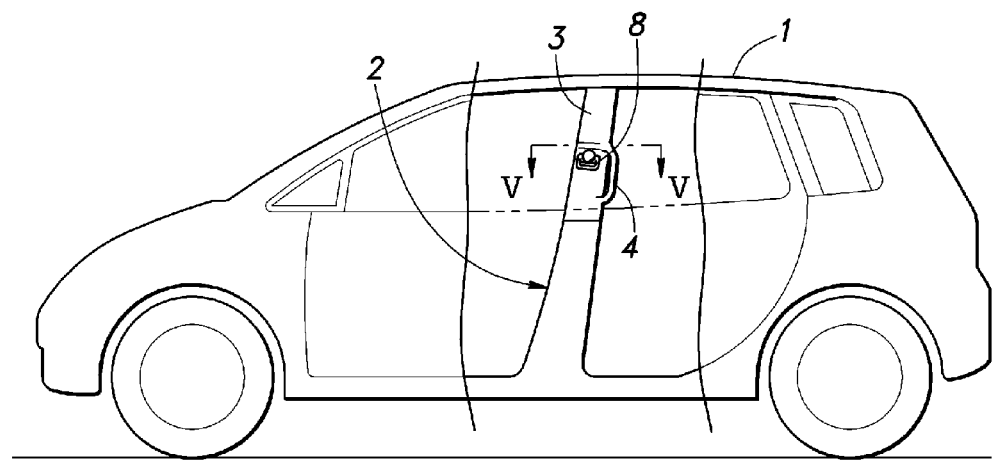
FIG. 1 is an overall outline view of a motor vehicle body of the present invention.

A preferred embodiment of the present invention will be described in the following with reference to the appended drawings. FIG. 1 is an overall outline view of a motor vehicle body 1 embodying the present invention. In FIG. 1, a part of the vehicle is removed to show a center pillar 2 as seen from inside the passenger compartment. The center pillar 2 of a four-door vehicle is described in the illustrated embodiment, but the present invention is not limited to such an embodiment but is also applicable to other pillar configurations.

Referring to FIG. 1, a garnish 3 formed by molding plastic material is provided on the inboard side of the upper half part of the center pillar 2. The upper end of the garnish 3 engages a roof side upholstery member, while the lower end of the garnish 3 engages another upholstery member provided on a lower half of the center pillar 2 in such a manner that the positional relationship of the garnish relative to the other members may be maintained. Also, the garnish 3 is integrally formed with an arch-shaped (arcuate), solid graspable grip 4 extending along the center pillar 2 so that a vehicle occupant may hold the grip when boarding and unboarding the back seat.

By integrally forming the grip 4 with the garnish 3 as an integral unit, the need for individually positioning the two parts is eliminated as opposed to the prior art in which the two parts are individually attached to the pillar. Also, the number of component parts can be reduced.

Figure 2:
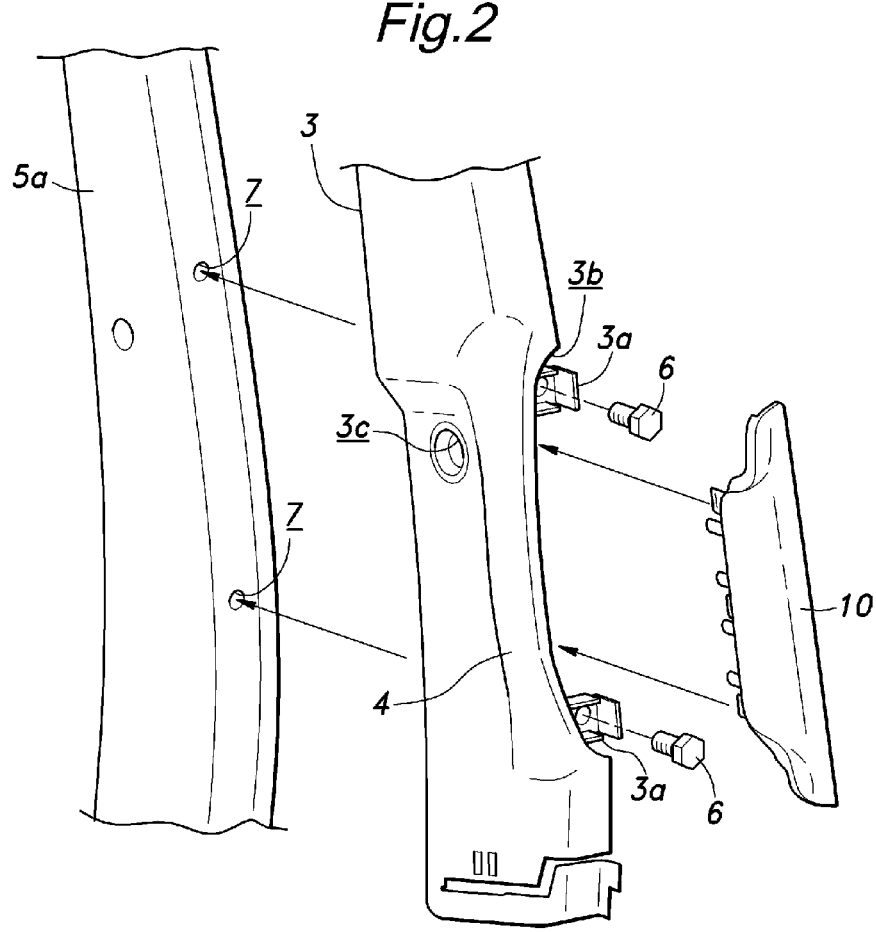
FIG. 2 is an exploded perspective drawing of a garnish of the present invention.

An exemplary structure of the garnish 3 will now be described with reference to FIGS. 2, 3, and 4. Referring to FIG. 2, the garnish 3 includes a pair of upper and lower tongue pieces or brackets 3a each having an opening for passing a threaded bolt 6 for securing the garnish 3 to an inner panel 5a of the center pillar 2, and an opening 3b for permitting access when threading the threaded bolts 6 into the inner panel 5a via the openings of the brackets 3a. The rearward facing side of the inner panel 5a is formed with a pair of threaded holes 7 for receiving the threaded bolts 6.

Figure 3:
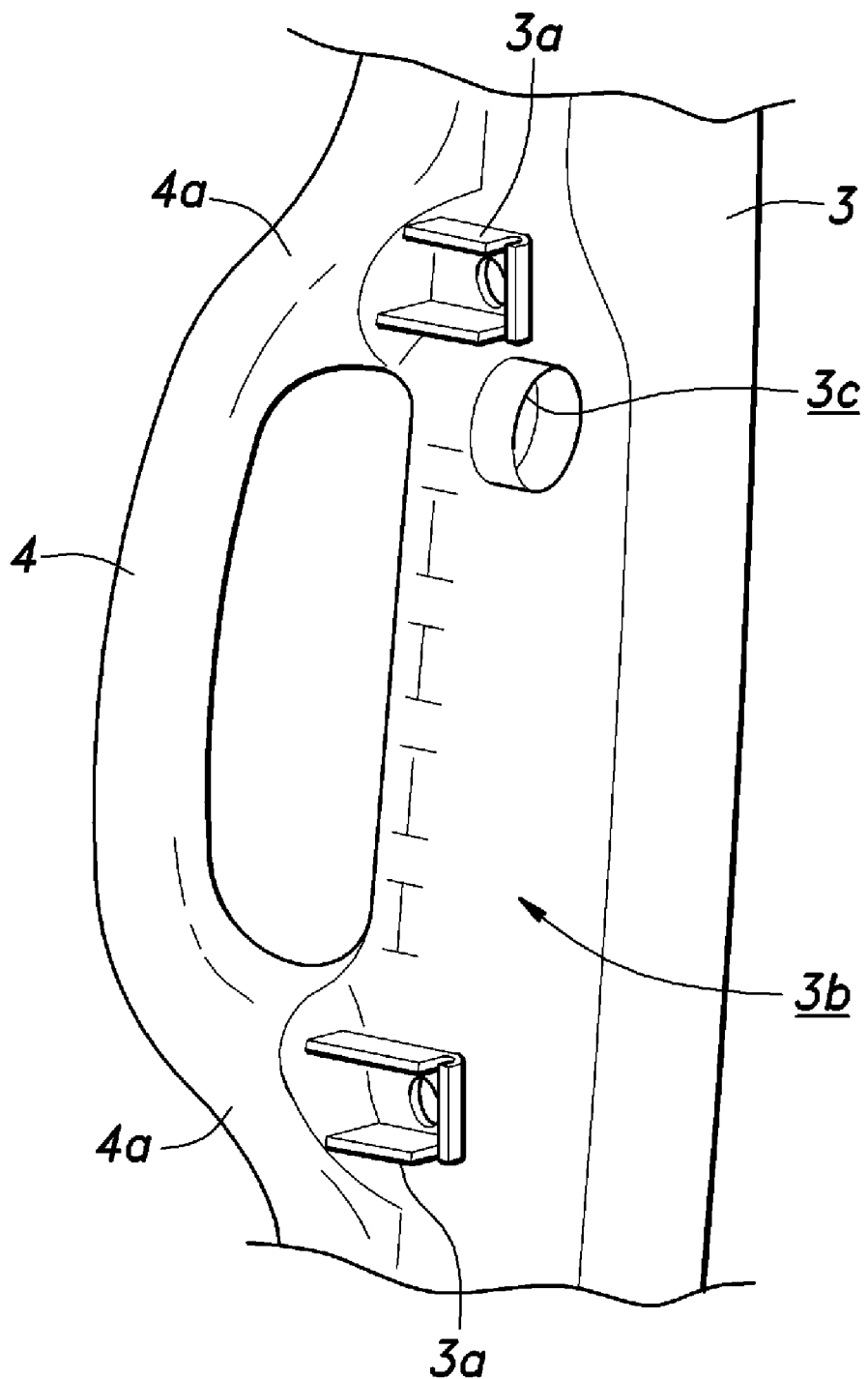
FIG. 3 is a perspective view of an essential part of the garnish when viewed from the backside of thereof (or from outside of the vehicle body)
Figure 4:
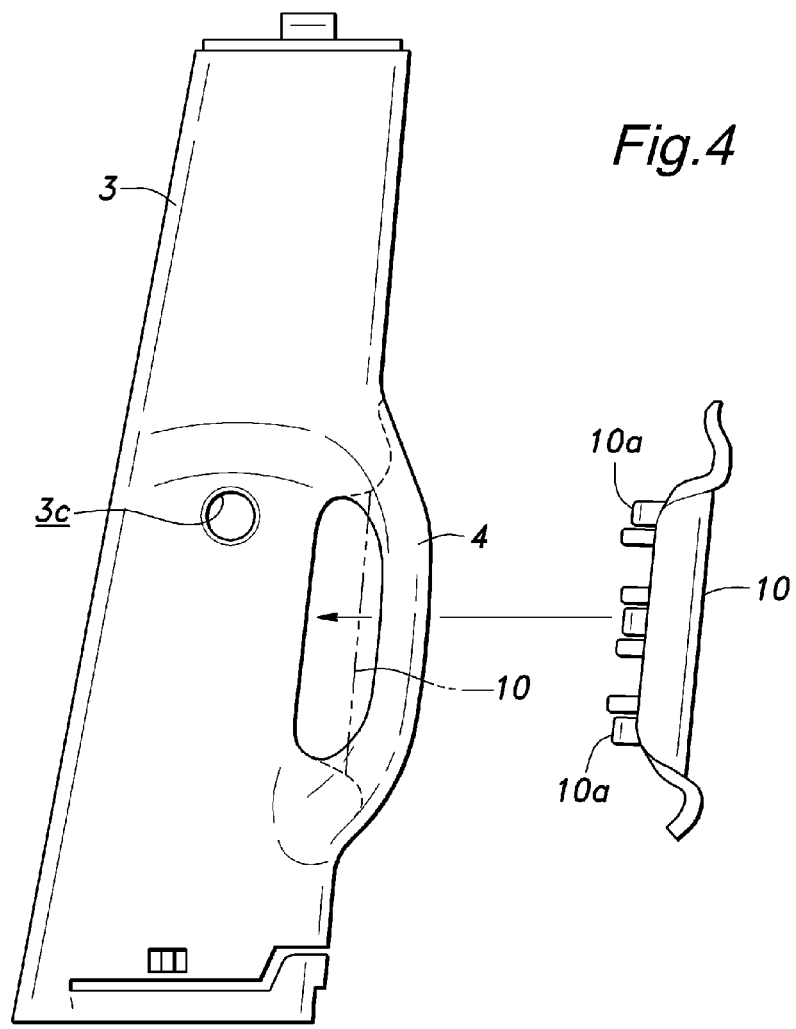
FIG. 4 is a front view of the garnish when viewed from the front side (or from inside the passenger compartment)

Referring further to FIG. 3, each mounting bracket 3a extends from the garnish 3 along the rearward facing side of the inner panel 5a adjacent to a corresponding base end 4a of the arch-shaped grip 4 in the installed state of the garnish 3. As the parts of the garnish 3 adjacent to the base ends 4a of the grip 4 are secured to the inner panel 5a by using threaded bolts, not only an adequate mechanical strength is given to the grip 4 but also a large load that may be applied to the grip 4 is prevented from being transmitted to other parts of the garnish 3 and thereby causing undesired deformation of the garnish 3.

Figure 5:
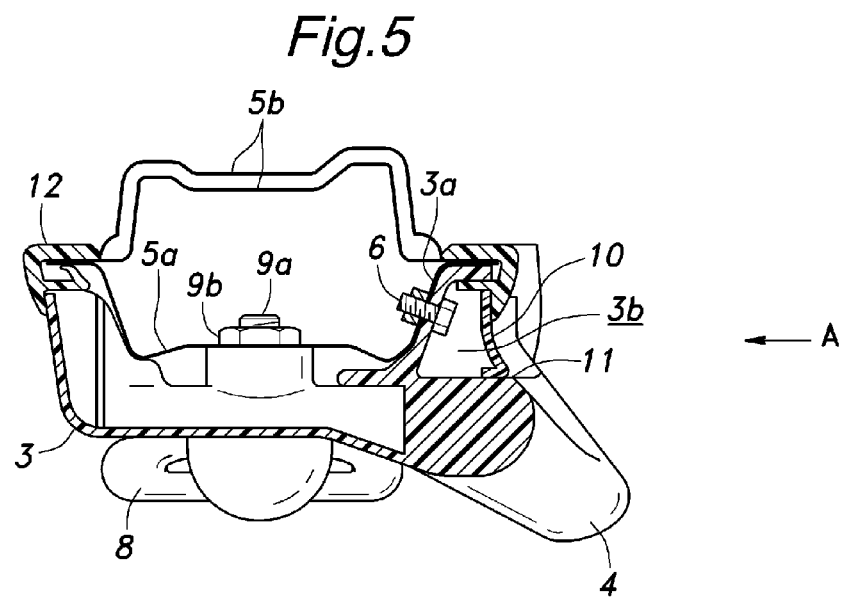
FIG. 5 is a cross-sectional view taken along line V-V of FIG. 1.

A through anchor 8 is disposed on the inboard side of the garnish 3, and is fixedly secured to the inner panel 5a by threading a threaded bolt 9a into a nut 9b fixedly attached to the back side of a corresponding part of the inner panel 5a as shown in FIG. 5. The garnish 3 is formed with a through hole 3c for receiving the threaded bolt 9a threaded into the nut 9b. As the garnish 3 is interposed between the threaded bolt 9b and inner panel 5a, the garnish 3 can be attached to the inner panel 5a in a highly secure manner. This, combined with the securing at the brackets 3a by using the threaded bolts, ensures a firm attachment of the garnish 3 to the inner panel 5a.

Also, after finishing the installation of the garnish 3 by using the threaded bolts 6, the opening 3b of the garnish 3 is closed by fitting a lid 10 made of a separate molded plastic member therein. Referring further to FIG. 4, the lid 10 is provided with a plurality of engagement claws 10a configured to engage the edge 11 of the opening 3b from inside. The mounting brackets 3a and the opening 3b are located more outboard than the grip 4 so that an edge 10b of the lid 10 is concealed by the grip 4 when the garnish 3 is viewed from the passenger compartment in the assembled state of the garnish 3. Therefore, the parting line (or edge) that is created by attaching the separate lid 10 to the garnish 3 is made hardly noticeable, and this enhances the external appearance of the structure for mounting the lid 10 to the garnish 3.

In the illustrated embodiment, the garnish 3 is made of a molded plastic member, the grip 4 projects in a fore and aft direction of the vehicle body (more specifically, in a rearward direction of the vehicle body), and the edge 11 of the opening 3b adjoining the grip 4 does not overlap with the grip 4 when viewed in the fore and aft direction of the vehicle body (access direction directed from the rear of the vehicle as indicated by an arrow A in FIG. 5, for instance). Thereby, the lid 10 may be straightly fitted into the opening 3b in the direction indicated by the arrow A without being interfered by the grip 4. Furthermore, the direction of removing a mold part for forming the opening 3b may be made exactly opposite to the direction of removing a mold part for forming the grip 4 so that the molding process can be simplified.

As shown in FIG. 5, the inner panel 5a and an outer panel 5b of the center pillar 5 jointly form a per se known closed cross section frame, and a flange formed between the two panels 5a and 5b is fitted with a trim member or a mold member 12. The mold member 12 not only conceals the flange but also may be configured to conceal the gap between the edge of the garnish 3 and the inner panel 5a. In particular, the outboard edge of the lid 10 or the edge thereof adjacent to the inner panel 5a may be concealed by the mold member 12. Therefore, even when the edge of the garnish 3 adjacent to the inner panel 5a fails to align with the edge of the lid 10 adjacent to the inner panel 5a due to manufacturing errors of the lid 10, the mold member 12 will conceal such a misalignment, and the attractiveness of the structure is in no way detracted.

REFERENCE NUMERALS 1 vehicle body
2 center pillar
3 garnish
3b opening
3a mounting bracket (bracket for attachment) grip
5a inner panel (pillar)
10 lid
10b, 11 edge
12 mold member (trim member)

The invention claimed is:

1. A mounting structure for a pillar garnish, comprising:
a garnish covering an inboard side of a pillar of a vehicle body; and
a grip provided on an inboard side of the pillar so as to be graspable for a vehicle occupant boarding or unboarding the vehicle, the grip being integrally molded with the garnish;
wherein the garnish comprises a mounting bracket integrally formed in an outboard part of the garnish and protruding outwardly therefrom adjacent to a base end of the grip, and an opening affording an access to the mounting bracket, the garnish further comprising a lid closing the opening.

2. The mounting structure for a pillar garnish according to claim 1, wherein the grip is given with an arch-shape extending in a fore and aft direction, and the grip does not overlap with an edge of the opening adjacent to the grip.

3. The mounting structure for a pillar garnish according to claim 1, wherein an outboard edge of the lid is positioned so as to be covered by a trim member attached to the pillar.

* * * * *